6041X
E. Lester.
Fire-Place.
Patented June 21, 1830.
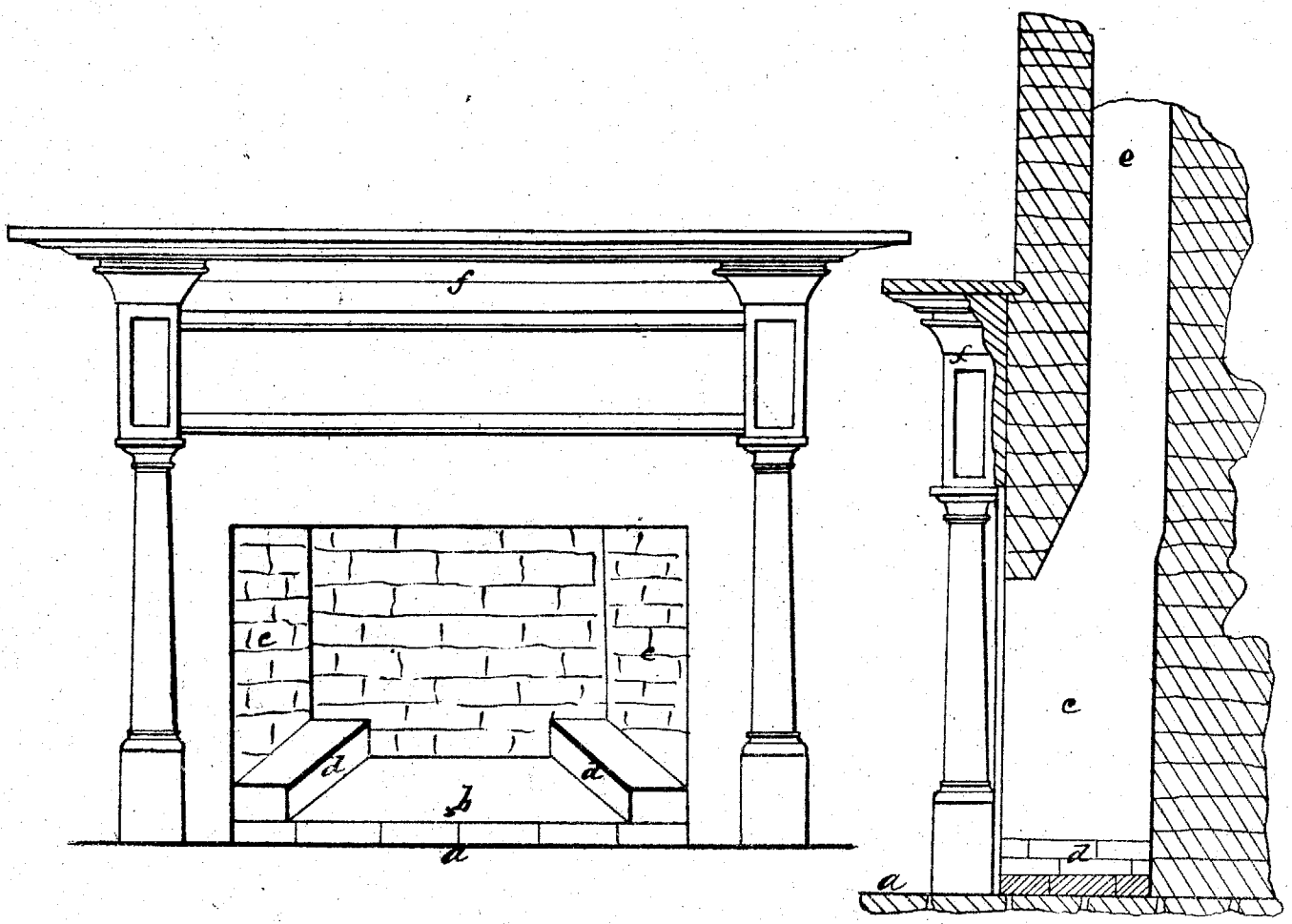

Ebenezer Lester of Killingworth. Connecticut.

Letters Patent.

The schedule referred to in these Letters Patent and making part of the same, containing a description in the words of the said Ebenezer Lester himself of his improvement in the construction of Fire Places.

To all to whom these presents shall come.

Be it known that I Ebenezer Lester of Killingworth in in the County of Middlesex & State of Connecticut, have invented a new and useful improvement in the construction of fire places, adapted to the use of wood or coal, and aiding in the draught of the smoke. This improvement consists in raising within the jambs on the hearth, and in a line from the one to the other, a second hearth, of two or more inches in height, formed of brick, stone, or other material, thereby raising the whole recess of the fire place to the required height; on this hearth at each end raise or build up of brick, stone, or other material, an abutment, the front edge of which is flush with the front of the false hearth, before stated, extending inward into the fire place to the back of the same and along the jambs, so as to form solid work; these abutments may be of two or more inches in height, and the space between them in the centre for an air flue which extends between them to the back of the fire place, may be, of from six to thirty inches in width depending somewhat on the size of the fire place, and these abutments may be secured (if built of brick or stone) by iron ties from the chimney back & hearth. Over the air flue place the wood, the ends of which rest on the abutments, and in case of using coal, cover the air flue with a grate of such form as fancy or convenience may dictate or suggest; by this means the air for combustion is supplied through the flue, and less fuel will be required than in the plan heretofore used. In case Andirons or fire dogs are used, an extension of the size of the second hearth may be made sufficiently large for placing them on. The inventor does not hereby claim, as his invention,—fire place, flues, hearths, nor jambs; but merely the manner of improving them by the addition of the beforementioned means.

Witness James A. Pratt
Austin Olcott

Ebenezer Lester.

Exd [illegible]

[illegible]